United States Patent [19]

Tao et al.

[11] 4,175,312
[45] Nov. 27, 1979

[54] METHOD OF ASSEMBLING A SETTLING TANK

[75] Inventors: Fan-Sheng Tao, Morro Bay, Calif.; John E. Warner, Houston, Tex.

[73] Assignee: Texaco Inc., White Plains, N.Y.

[21] Appl. No.: 910,400

[22] Filed: May 30, 1978

Related U.S. Application Data

[60] Division of Ser. No. 827,914, Aug. 26, 1977, Pat. No. 4,122,016, which is a continuation-in-part of Ser. No. 710,076, Jul. 30, 1976, abandoned.

[51] Int. Cl.² .............................................. B23P 19/00
[52] U.S. Cl. ................................ 29/428; 113/120 R
[58] Field of Search ............... 29/428, 157 R; 210/84, 210/47, 521, 522; 113/120 R

[56] References Cited

U.S. PATENT DOCUMENTS

| | | | |
|---|---|---|---|
| 1,869,758 | 8/1932 | Lungstras | 210/521 |
| 2,009,510 | 7/1935 | Mobley | 210/521 X |
| 2,056,763 | 10/1936 | Bays | 210/84 X |
| 2,134,203 | 10/1938 | Raymond et al. | 210/521 X |
| 2,261,101 | 10/1941 | Erwin | 210/84 X |
| 2,822,153 | 2/1958 | Arnold | 29/428 X |
| 3,703,467 | 11/1972 | Lummus et al. | 210/522 |
| 4,123,365 | 10/1978 | Middelbeek | 210/521 |
| 4,126,925 | 11/1978 | Jacuzzi | 29/428 |

FOREIGN PATENT DOCUMENTS 24417 10/1883 Fed. Rep. of Germany ............. 210/84

Primary Examiner—Charlie T. Moon
Attorney, Agent, or Firm—Carl G. Ries; Thomas H. Whaley; Theron H. Nichols

[57] ABSTRACT

A settling tank for resolving a mixture of oil, water, and solids from an oil and solids-in-water influent includes two inclined and parallel baffles about which the influent water successively passes. Each baffle preferably has parallel V-shaped grooves in the under surface thereof for entrapping, guiding, and coalescing the oil droplets into large globs for channeling and passing through the openings between the baffles and the tank wall for rising to the surface for draw off. The clear water outlet is positioned on a horizontal plane intermediate horizontal planes through the low forward end of the upper baffle and the high rear end to ensure delivery of an oil-free and solids-free water. An upper oil outlet ensures delivery of a solids-free and water-free oil from the settling tank. A new method for assembling a settling tank is disclosed.

4 Claims, 4 Drawing Figures

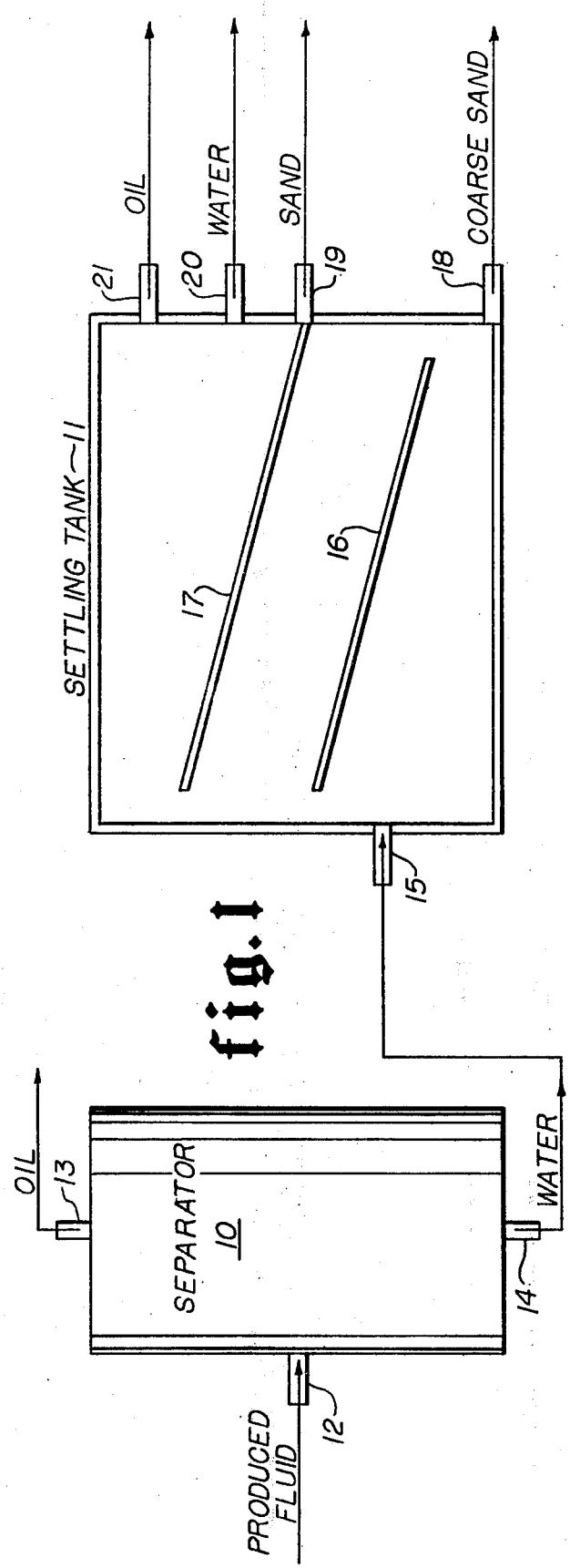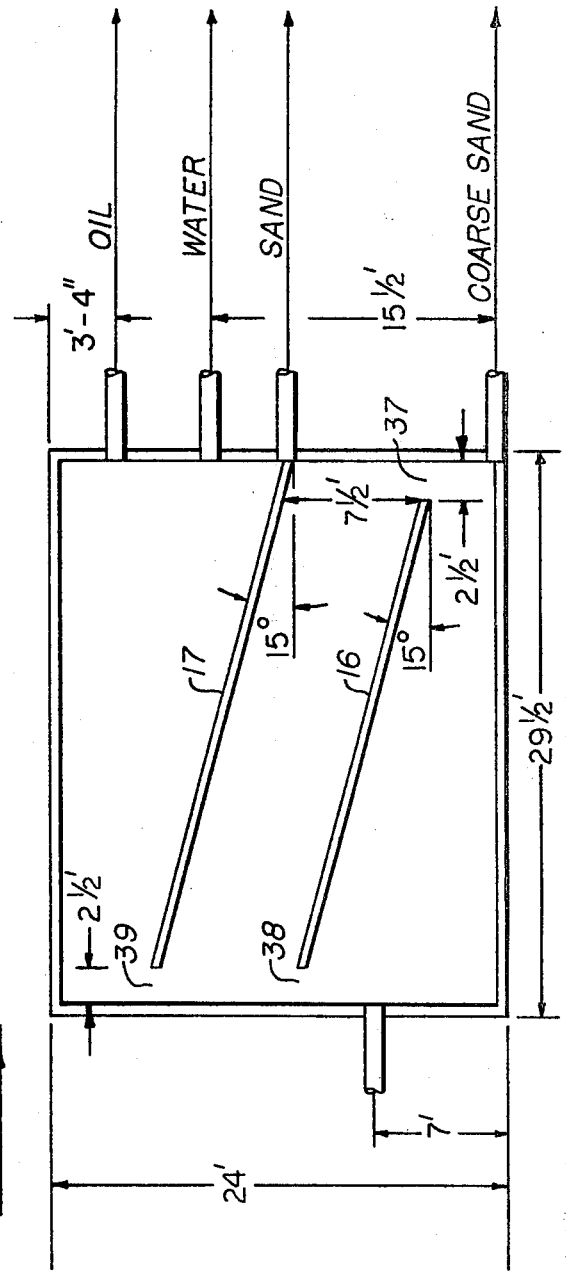

METHOD OF ASSEMBLING A SETTLING TANK

This is a division of application Ser. No. 827,914, filed Aug. 26, 1977, now U.S. Pat. No. 4,122,016, which is a continuation-in-part of application Ser. No. 710,076, filed July 30, 1976, now abandoned.

BACKGROUND OF THE INVENTION

In oil fields particularly, better settling tanks are needed to provide time for oil to separate from produced brines and water. Environmental considerations require that the oil content of the produced water be reduced to an acceptable level, no more than 150–200 ppm (parts per million) of oil in the water discharged into rivers or streams nearby. Likewise, clean water is most important for reinjecting into walls for secondary recovery.

The conventional system comprises the utilization of a stripper tank or separator for passing the produced fluid therethrough for separation of oil from water. This fluid may include oil, water, and an emulsion of the two. This separator may use chemicals and/or heat to separate the oil and water from the oil-water emulsions. This water usually has an oil content of about 400 ppm of oil in the water.

Because this water contains about 400 ppm of oil, it is too polluted to dump into any streams or rivers, it has too much oil in it to use in an injection well for water flooding, and thus it must be stored or treated further.

A feature of this invention is the great savings resulting by providing a new settling tank that produces a cleaner water for injecting into injection wells.

The recovered oil soon pays for the cost of the settling tank:

400-ppm oil in inlet water to settling tank.
−150-ppm oil in output water from settling tank.
250-ppm oil removed and recovered.
10,500 BPD (barrels per day) water through the settling tank.
(10,500×250)/(1,000,000)=2.625 BPD oil recovered from settling tank.
$14.00—a typical purchase price per barrel for foreign oil.
Savings 1 year=2.6×365=949 barrels per year×$14.00=$13,286.00.

Likewise, the cleaner water will pass more freely through the formation sands to more easily displace oil towards the producing wells. It is shown below what the savings would be by just extending the life by one year of each of 80 oil wells feeding their waste water to the new settling tank. Obviously, more than one year extension of life would likely occur in the wells when considering that the average life of a well may be 20 years before secondary recovery, as by water flooding is initiated, as when the well production reaches a low of below 5 BPD, for example.

This average is difficult to calculate, as for example, production started in one field of oil wells at Sour Lake, Texas, in January 1903, and the wells were still producing nearly 1,600 barrels per day at the end of 1976.

The savings for each year extension of life of the wells due to the new settling tank in the above exemplary field of 80 wells down to the minimum production of 5 BPD is: 80×5×365=146,000 bbl/oil×$14.00=$2,044,000.00.

In addition, this compact and space saving settling tank formed by the disclosed method is very attractive economically where space is expensive, such as on off-shore platforms.

A new method for forming or assembling a settling tank likewise is disclosed hereinafter.

OBJECTS OF THE INVENTION

A primary object of this invention is to provide an improved settling tank for resolving a mixture of oil, water, and solids from an oil and solids-in-water influent.

Another object of this invention is to provide a settling tank having at least two declined baffles with a clean water discharge intermediate the level of the two ends of the top declined baffle.

A further object of this invention is to provide a cylindrical settling tank that has a baffle support system that is simple, economical, and easy to assemble.

A still further object of this invention is to provide a cylindrical settling tank that has a drain for discharge of solids that have collected at one end of an upper inclined baffle fixed to one side of the tank wall, an oil outlet at the surface of the fluid in the tank, and a clean water outlet between the oil outlet and the solids outlet.

Still another object of this invention is to provide a new method of forming or assembling a settling tank with two forwardly declined baffles.

A further object of this invention is to provide a settling tank for removing oil and solids from an oil and solids-in-water influent that is easy to operate, is of simple configuration, is economical to build and assemble, and is of greater efficiency for the collection of oil and solids from a water mixture.

Other objects and various advantages of the disclosed settling tank and method of forming the tank will be apparent from the following detailed description, together with the accompanying drawings, submitted for purposes of illustration only and not intended to define the scope of the invention, reference being made for that purpose to the subjoined claims.

BRIEF DESCRIPTION OF THE DRAWINGS

The drawings diagrammatically illustrate by way of example, not by way of limitation, one form or mechanism formed by the disclosed methods of the invention wherein like reference numerals have been employed to indicate similar parts in the several views in which:

FIG. 1 is a schematic perspective view of a system for resolving water, oil, and solids from oil well production fluids;

FIG. 4 is an enlarged schematic right side view of the new settling tank showing dimensions of a typical settling tank.

Figure 2:
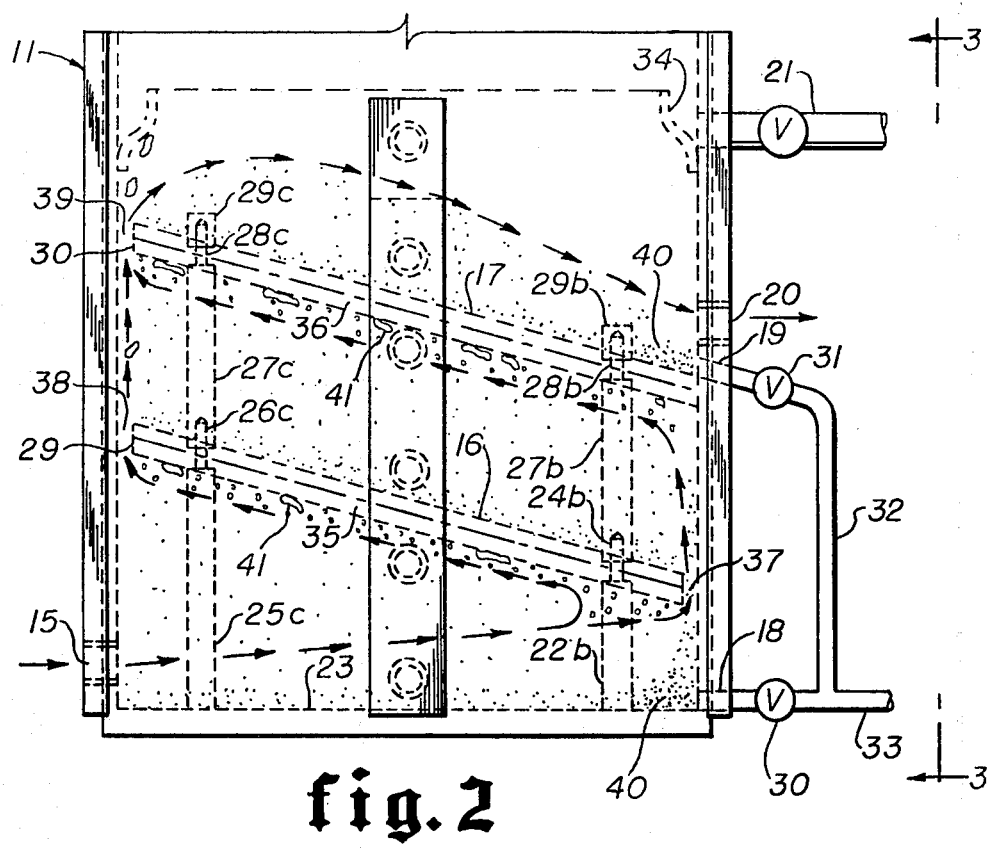
FIG. 2 is a schematic right side view of the disclosed settling tank with parts in section for clarity of disclosure.

The invention disclosed herein, the scope of which being defined in the appended claims, is not limited in its application to the details of construction and arrangement of parts shown and described that could be formed by the disclosed methods, since the invention is capable of other embodiments made by other methods and of being practiced or carried out in various other ways. Also, it is to be understood that the phraseology or terminology employed herein is for the purpose of description and not of limitation. Further, many modifications and variations of the invention as hereinbefore set forth will occur to those skilled in the art. Therefore, all such modifications and variations which are within the spirit and scope of the invention herein are included and only such limitations should be imposed as are indicated in the appended claims.

DESCRIPTION OF THE SETTLING TANK

FIG. 1 illustrates a schematic view of an oil field water producing system including a conventional separator 10 for separating oil and water from the produced fluid from a well (not shown) and the new settling tank 11 for receiving the water from the separator and cleaning it to meet environmental standards.

The conventional separator 10, FIG. 1, receives the produced fluid in its inlet 12, adds chemicals and/or heat to it for discharging oil from oil outlet 13 and water from water outlet 14.

The produced water from the separator 10, FIG. 1, contains some solids as sand, and oil as about 400 ppm (parts per million). This water, oil and solids-in-water influent enters inlet 15 on the rear wall of the settling tank, passes under and over two declined baffles 16 and 17 therein with coarse sand or solids emerging from a bottom outlet 18 in the front wall, fine sand or solids emerging from an outlet 19 on the front wall at the level of the lower end of the upper baffle 17, clean water emerging from an outlet 20 on the front wall just over the fine sand outlet 19, and oil emerging from an outlet 21 in the settling tank well above the level of the top of the upper inclined baffle 17. The clean water contains usually not more than 150 ppm of oil, which is clean enough to dump into existing rivers or streams or to pump back into injection wells for purposes of secondary recovery.

Figure 3:
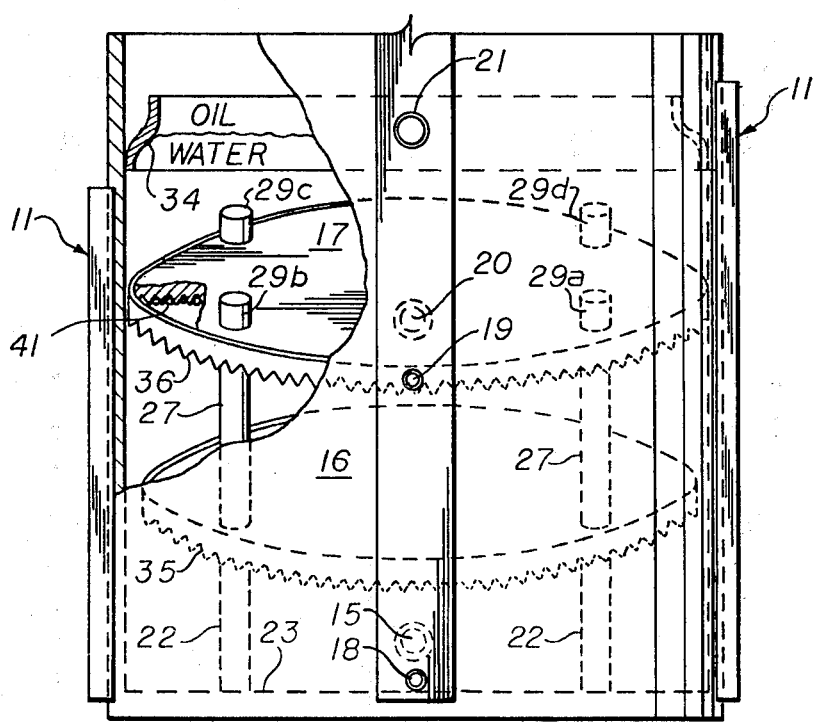
FIG. 3 is a schematic front view taken at 3—3 on FIG. 2.

FIGS. 2 and 3 disclose more details of the new settling tank.

FIG. 2 illustrates a schematic side view of cylindrical settling tank 11, with parts in section, showing an inlet 15 low on the back wall for injecting an oil and solids-in-water influent and an outlet 20 positioned slightly above the solids outlet 19 in the front wall for ejection and delivery of an oil and solids-free water effluent.

Two cylindrical baffles 16 and 17, FIG. 2, are both mounted parallel to each other and both declined forwardly in the tank 11. Two front short legs 22b, 22a, FIG. 3, are secured to the tank bottom 23 and extend up with a threaded stud 24b, FIG. 2, 24a (not shown) thereon extending up through the front portion of the lower baffle 16 with shoulders supporting the lower baffle front portion. Longer rear legs 25c, 25d (not shown) extend up from the tank bottom 23 to support the higher rear portion of the forwardly declined lower baffle 16. Studs 26c, FIG. 2, 26d (not shown) protrude through the rear higher portion of the low baffle 16 to maintain the low baffle fixedly secured at the predetermined angle of forward declination.

Upper baffle 17, FIG. 2, is supported on the shoulders of four equal length spacers 27a, 27b, 27c, and 27d (27a and 27d not shown on FIG. 2) which are each screwed onto the four studs 24a, 24b, 24c, and 24d, respectively. Four threaded studs 28a, 28b, 28c, and 28d are formed on the four respective spacers 27a-27d, each have a cap, 29a-29d, thereon for maintaining the upper cylindrical baffle in its predetermined angle of forward declination relative to the horizon and accordingly parallel to the lower cylindrical baffle. The two baffles 16 and 17 form the lower chamber, intermediate chamber, and upper chamber in the tank 11.

The periphery of the lower cylindrical baffle 16 is spaced a predetermined distance from the internal tank wall surface which forms an opening 38 in the upper end of the lower declined baffle for permitting the upward flow of the separated oil from the lower compartment to the intermediate compartment. However, the forward and lower half of the upper cylindrical baffle 17 is fixedly secured to the forward cylindrical wall of the tank 11 with the back portion of the baffle 17 spaced from the tank back cylindrical wall for forming an opening 39 in the upper end of the upper declined baffle for upward flow of the separated oil to the water surface in the upper compartment. The above described spacing and contact of the baffles with the tank walls is necessary for guiding the flow of the oil and solids-in-water influent under the lower baffle from the rear to the front of the tank as viewed in FIGS. 1, 2, and 4 from left to right, up through the port or opening 37 between the lower baffle front edge and the tank front cylindrical wall, and back to the rear of the tank between the two baffles to rise through port or opening 39 between the rear peripheral edge of the upper baffle and the tank rear cylindrical wall.

Important features of this settling tank are the two solids discharge outlets 18 and 19, FIG. 2, each having a valve 30 and 31, respectively. Interconnecting duct 32 between outlets 18 and 19 discharge the solids from upper outlet 19 to join with that from lower outlet 18 to discharge solids from solids discharge duct 33. These solids are discharged either on a regular basis or only intermittently when required.

With effluents having few solids, and which solids when flowing under and over the lower baffle 16 settle to the tank bottom 23, and which solids from the effluent flowing over the upper baffle 17 settle thereon, solids discharge outlets 18 and 19 are not always required.

FIG. 2 illustrates the principal feature of the disclosed settling tank. The outlet 20 for clean water is positioned in the tank cylindrical front wall portion spaced just above the front low end of the upper baffle 17 and its solid discharge outlet 19, and below the horizontal plane of the upper rear end of the upper baffle which ensures that all oil on the surface will be drawn out from the oil outlet 21 and that all solids will flow off the tank bottom and off the top of the upper baffle through solids outlets 18 and 19, respectively. A weir 34 is secured near the upper periphery of the tank for catching the oil in a trough therebehind. One or more outlets 21 drains the oil from the trough to a suitable oil supply tank. The water level may be maintained at a predetermined level by discharge valves 30 and 31 in order to discharge only oil over the weir.

FIG. 3 illustrates another principal feature of the disclosed invention comprising longitudinally extending parallel V-shaped grooves 35, 36, formed in the under surface of both lower and upper baffles, respectively. The grooves extend fore and aft, parallel to a vertical plane through the inlet and outlet, 15 and 20, respectively, and parallel to the direction of forward inclination of the parallel baffles. Thus as the oil and solids-in-water influent passes under the lower baffle 16, FIG. 2, the oil that rises to the grooved bottom 35 of the lower baffle is guided to the rear of the tank where it rises between the rear edge of the lower baffle and the tank circular wall forming opening 38 and up between the rear edge of the upper baffle and the tank wall forming opening 39 to rise to the surface for discharge from outlet 21. Likewise, as the oil and solids-in-water influent passes up and around the forward edge of the lower baffle 16, and back, under the upper baffle 17, the grooves in the under surface thereof guide the oil that has separated and risen to the grooves to rise in the grooves 36 to the rear edge of the upper baffle and the tank circular wall to the water surface above for discharge over the weir and out the oil outlet 21. Accordingly, the droplets of oil are entrapped in the grooves regardless of the direction of the whirling currents of oil and solids-in-water. Thus, the droplets of oil are coalesced as they are guided to the rear to form larger globs 41 of oil which in turn channel more easily to the surface up between the baffle and the tank rear wall for passing over the weir and out the oil drain outlet.

The baffles have been proven to be very effective in the new settling tank. The disclosed settling tank was placed beside a similar settling tank of the same size but with no baffles. The non-baffled settling tank removed 53 percent of the oil from an oil-in-water mixture while the new baffled settling tank separated 67 percent of the oil from the mixture, an improvement of over 26 percent.

Flat spaces between vertical angle irons as utilized in the cleaning of gasoline in U.S. Pat. No. 1,869,758 obviously will not coalesce any droplets of oil if used for the different purpose of separating oil from water. The grooves must be V-shaped.

Methods practiced by the above described settling tank are disclosed in inventors' copending application Ser. No. 710,075, filed July 30, 1976 now abandoned by the same assignee.

Briefly, in operation of the settling tank 11, the oil and solids-in-water influent or water separated from the oil in the separator 10, FIG. 1, usually has about 400 ppm oil therein. This influent enters inlet 15 of the settling tank and most of it passes forwardly under lower grooved baffle 16 and then back under upper grooved baffle 17 to the rear of the tank. From the first forward pass the heaviest solids settle out to the bottom of the tank, and the oil droplets are coalesced as they are guided to the rear to form larger globs of oil which then rise more easily to the surface. On the rearward pass over the lower baffle 16, the solids that settle out have slid down the lower baffle to a position immediately in front of the solids outlet 18. The oil droplets are coalesced as they are guided to the rear by the grooved under surface of upper baffle 17 to form larger globs of oil which then rise to the surface. Over predetermined spaced intervals of time, solids exhaust valve 30, FIG. 2, is opened for flushing the bottom solids forwardly intermittently to exit through solids outlet 18.

From the rear of the tank the flow of influent is forwardly over the declining upper baffle, where the remaining oil therein flows to the surface, the remaining solids, as fine sand, settle out onto the declined baffle for being ejected out solids outlet 19, and the oil and solids-free effluent or clean water is ejected out clean water outlet 20. Because this effluent contains only about 150 ppm oil, the savings as described in the example above of approximately $13,286 will occur in oil reclaimed each year, plus approximately $2,044,000 extra for each year extension of the wells due to injecting cleaner water in secondary recovery.

METHOD FOR ASSEMBLY OF A SETTLING TANK

While many methods may be utilized for assembling or forming a settling tank, the method below is a preferred method.

1. Forming or assembling an upright cylindrical tank 11 with an inlet 15 in the lower back side thereof for receiving from the separator (FIG. 1) and injecting the mixture of oil (about 400 ppm), solids, and water across the length of the bottom of the tank from back to front;

2. Mounting or assembling at least two vertically spaced apart baffles 16 and 17 in the tank 11 with each baffle declined forwardly and downwardly for forming the lower, intermediate, and upper compartments;

3. Forming a lower port 37 in the lower front end of the lower declined baffle 16 in the tank 11 for receiving fluid flow up from the lower compartment for flowing to the intermediate compartment;

4. Forming a part 38 in the upper rear end of the tank lower declined baffle 16 for upward flow of the coalesced oil globs from the lower compartment into the intermediate compartment;

5. Forming a port 39 in the upper rear end of the tank upper declined baffle 17 for fluid flow from said intermediate compartment upwardly to the upper compartment;

6. Forming or shaping longitudinal V-shaped grooves 35 and 36 fore and aft in the under surfaces of both baffles for guiding and coalescing the drops of oil into larger globs of oil for being guided to the baffle rear ends and to the surface for discharge out of the oil outlet 21 as water-free oil; and 7. Forming or fastening a water outlet 20 in the tank 11 adjacent the lower end of the upper compartment for discharge of oil-free water.

A modified settling tank for effluents of high solids content may be formed by adding the following steps:

1. Forming or fastening a lower solids outlet 18 in the tank wall below the level of the lower declined baffle or on the level of the tank bottom for discharge of the solids that have settled in the lower compartment; and 2. Forming or securing an upper solids outlet 19 in the tank 11 above the lower solids outlet 18 for discharge of solids from off the upper baffle in the upper compartment for providing a settling tank that produces solids-free water and solids-free oil.

Obviously other settling tanks may be utilized for separating oil, water, and solids and other methods for forming a settling tank may be utilized than those listed above, depending on the particular information desired.

Accordingly, it will be seen that at least one settling tank and at least one method for forming a settling tank have been described which will operate in a manner which meets each of the objects set forth hereinbefore.

While only one mechanism and one method of the invention have been disclosed, it will be evident that various other modifications and methods are possible in the arrangement and construction of the disclosed settling tank and method of forming a settling tank without departing from the scope of the invention and it is accordingly desired to comprehend within the purview of this invention such modifications and methods as may be considered to fall within the scope of the appended claims.

We claim:

1. A method for assembling a settling tank for resolving a mixture of oil, solids, and water comprising, (a) forming an upright tank with an inlet in the lower back side thereof for injecting the mixture of oil, solids, and water across the length of the tank from back to front and with a bottom, (b) mounting two vertically spaced apart baffles in the tank each declined forwardly for forming lower, intermediate, and upper compartments, (c) forming a lower port in the lower front end of the lower declined baffle in the tank for receiving fluid flow up from the lower compartment for flowing to the intermediate compartment, (d) forming a port in the upper rear end of the tank upper declined baffle for fluid flow from said intermediate compartment upwardly to the upper compartment, (e) the tank bottom and the two baffles forming means for receiving solids from the mixture of oil, solids, and water as it passes thereover, (f) forming a water outlet in the tank in the lower end of the upper compartment for discharge of solids-free and oil-free water, and (g) forming an oil outlet in the tank for the upper compartment above the water outlet for drawing off solids-free and water-free oil.

2. A method as recited in claim 1 wherein the second method step includes further, (a) forming longitudinal V-shaped grooves fore and aft in the under surfaces of both baffles for guiding and coalescing the drops of oil into larger globs of oil for being guided to the baffle rear ends and to the surface for discharge out of the oil outlet as solids-free and water-free oil.

3. A method for assembling a settling tank as recited in claim 1 wherein, (a) forming a lower solids outlet in the tank wall below the level of the lower declined baffle for discharge of the solids that have settled in the lower compartment, and (b) forming an upper solids outlet in the tank above the lower solids outlet for discharge of solids from the upper compartment for providing a settling tank that produces solids-free and oil-free water and solids-free and water-free oil.

4. A method for assembling a settling tank for resolving a mixture of oil, solids, and water comprising, (a) forming an upright tank with an inlet on the lower back side thereof for injecting a mixture of oil, solids, and water, across the length of the tank bottom, (b) mounting securely in the tank two vertically spaced baffles declined forwardly for forming lower, intermediate, and upper compartments, (c) forming longitudinal V-shaped grooves fore and aft in the under surface of each of the upper and lower declined baffles for guiding and coalescing the droplets of oil that have separated from the mixture in the lower and intermediate chambers into larger globs of oil for being guided in the V-shaped grooves to the upper ends of the declined baffles and then to the surface for discharge as a solids-free and water-free oil, (d) forming a water outlet in the lower end of the upper compartment tank wall for discharge of oil-free water, and (e) forming an oil outlet in the upper compartment tank wall above the water outlet for drawing off water-free oil.

* * * * *